United States Patent
Pirkle et al.

(10) Patent No.: US 9,892,288 B2
(45) Date of Patent: Feb. 13, 2018

(54) PROCESS FOR MANUFACTURING DECORATIVE MULTILAYER COATINGS METHOD OF USE THEREOF

(71) Applicant: Modagrafics, Rolling Meadows, IL (US)

(72) Inventors: Paul Robert Pirkle, Naperville, IL (US); Michael L Antongiovanni, Crystal Lake, IL (US); Harry Adams, Chicago, IL (US)

(*) Notice: Subject to any disclaimer, the term of this patent is extended or adjusted under 35 U.S.C. 154(b) by 0 days.

(21) Appl. No.: 15/442,109

(22) Filed: Feb. 24, 2017

(65) Prior Publication Data

US 2017/0243030 A1     Aug. 24, 2017

Related U.S. Application Data

(60) Provisional application No. 62/299,280, filed on Feb. 24, 2016.

(51) Int. Cl.
G06K 1/12       (2006.01)
B41M 3/00      (2006.01)
B41J 2/01        (2006.01)
B32B 38/00    (2006.01)

(52) U.S. Cl.
CPC ............ *G06K 1/121* (2013.01); *B32B 38/145* (2013.01); *B41J 2/01* (2013.01); *B41M 3/008* (2013.01); *B32B 38/0004* (2013.01); *B32B 2309/10* (2013.01); *B32B 2451/00* (2013.01); *B32B 2605/006* (2013.01)

(58) Field of Classification Search
CPC .......... B41M 3/00; B41M 3/008; B41M 7/00; B41M 7/0027; B41M 7/0045; B41M 7/0054; B41M 2205/42; G06K 1/121; B32B 38/0004; B32B 38/145; B41J 2/01
USPC ......................................................... 347/107
See application file for complete search history.

(56) References Cited

U.S. PATENT DOCUMENTS

| | | | | |
|---|---|---|---|---|
| 4,933,120 A | * | 6/1990 | D'Amato | B41M 3/00 264/1.34 |
| 5,003,915 A | * | 4/1991 | D'Amato | B41M 3/00 118/212 |
| 2004/0209028 A1 | * | 10/2004 | Gosselin | B32B 27/08 428/40.1 |
| 2012/0200885 A1 | * | 8/2012 | Matsuzawa | B41J 11/46 358/1.15 |
| 2013/0167355 A1 | * | 7/2013 | Lutz | B44C 1/1729 29/428 |

* cited by examiner

*Primary Examiner* — Huan Tran
*Assistant Examiner* — Alexander D Shenderov
(74) *Attorney, Agent, or Firm* — Vedder Price P.C.

(57) ABSTRACT

A process for optimizing the manufacture of decorative multilayer coatings for attachment to surfaces, including using a roll-to-roll printer to print a decorative layer on a surface of a film layer, wherein the decorative layer includes cutting lines and a first indication, using a curable roller coater to coat a layer on the surface above the print layer, using a laminator to laminate a mask over the print layer, using a cutter to cut the print layer into a cut print, and entering the cut print layer into a line printer to read the first indication and print a second indication on the cut print.

20 Claims, 5 Drawing Sheets

(FIG-1A of 11/194,744 from Prior Art)

(FIG-2 of 11194,744 from Prior Art)

(FIG 3 of U.S. Pat 8,852,369 from Prior Art)

(FIG 6 of U.S. Pat 8,925,223 from Prior Art)

PROCESS FOR MANUFACTURING DECORATIVE MULTILAYER COATINGS METHOD OF USE THEREOF

RELATED APPLICATIONS

This application claims priority to U.S. Provisional Application No. 62/299,280, titled "PROCESS FOR MANUFACTURING DECORATIVE MULTILAYER COATINGS, METHOD OF USE THEREOF," filed on Feb. 24, 2016.

BACKGROUND

Plain surfaces such as windows, outside surfaces of vehicles, vending machines, or even walls are enhanced by including a decorative pattern on them. This abstract concept of enhancing a surface was once done by artists using paint, brushes or other drawing media. Each surface was an original piece of work that required much time and effort to achieve.

In parallel, mankind invented the printing press. Initially, paper in the form of rolls was unrolled upon a flat surface where keys covered in ink were stamped on the surface. Over time, printing technology improved. Some printers were able to print on acetate and other transparent material using ink with quick-drying capacity. Some other printers were able to print on a rounded surface.

At the intersection of these two fields of technology is the field linked with printing of decorative patterns which can be used over different surfaces. For example, some printers now reproduce artworks via the principle of lithography. In 2005, U.S. application Ser. No. 11/194,744 described a roll processed decorative laminate construction. FIG. 1 reproduced herein taken as FIG. 1A from this prior art shows how an interior area of a mobile platform can be enhanced using a printed decorative laminate applied to a selected surface. This prior art technology describes how a first film like a 1.7 mm layer of polyvinyl fluoride film in gloss or semi-gloss can be used to give a transparency to light to the film layer. What is also shown is the use of an ultraviolet light-blocking additive to the laminate. As shown at FIG. 2 taken from this prior art, adjacent to the film layer 16 is an ink layer 18. The art teaches the use of a digital ink-jet printer to place the ink layer 18 on the film layer. As shown at FIG. 2, an adhesive layer 20 as pressure-sensitive adhesive is applied to a second film layer 22 made of polyvinyl fluoride film (PVF) generally opaque or white in color to create a background. As shown, the process of merging these two layers is roll processing with curing around 225 to 280 degrees Fahrenheit in what is described as lamination.

Six years later, in 2011, two different inventions were introduced relating to this technology. Attached as FIG. 3 is the reproduction of FIG. 3 from U.S. Pat. No. 8,852,369. As shown by the arrow A, a product 15 is unrolled over a series of subsequent steps R, R' and R" before being rewound into a second roll 17. As shown, three different 'ornamental patterns' are layered consequently on a transparent polymer using liquid applying stations 12, 13 and 14, each with a reservoir allowing for the multilayer coating. This technology teaches how multiple subsequent coats can be applied instead of using a color printer working on the medium.

The same year, U.S. Pat. No. 8,925,223 was filed as U.S. application Ser. No. 13/195,653, and it teaches as shown at FIG. 4 how the transparent film built with the above parameters and technology can be bent and formed into some type of transparent plastic container 25 with lips 27 to be secured on a medium, for example between pieces of paper.

In the past, because of the complexity of the manufacturing linked with producing large supports to be mounted on surfaces, clients often had single needs. The production of a single medium is best done with completely different technology. Today, clients have a need for lower-cost options, which in turn allows these same clients to order larger series, which as can be expected further lowers the cost. What is needed is a new process, method and product adapted for clients having larger needs.

BRIEF SUMMARY OF THE INVENTION

One embodiment of the current disclosure includes a process for optimizing the manufacture of decorative multilayer coatings for attachment to surfaces, that may include using a roll-to-roll printer to print a decorative layer on a surface of a film layer, wherein the decorative layer includes cutting lines and a first indication, using a curable roller coater to coat a layer on the surface above the print layer, using a laminator to laminate a mask over the print layer, using a cutter to cut the print layer into a cut print, and entering the cut print layer into a line printer to read the first indication and print a second indication on the cut print.

Another embodiment includes the step of the line printer retrieving the second indication from an external source based on the first indication.

In another embodiment, the second indicator is a graphic image.

In another embodiment, the first indication is a bar code.

In another embodiment, the first indication is a QR code.

In another embodiment, the external source is a database.

In another embodiment, the line printer prints a time and date stamp on the cut print.

In another embodiment, the line printer includes a reader configured to read the first indication.

In another embodiment, the surface has a width of between 36 inches and 60 inches.

In another embodiment, the surface is comprised on a plurality of removable and non removable layers.

Another embodiment of the present disclosure includes a manufacturing optimization system for decorative multilayer coatings for attachment to surfaces, the system may include a roll-to-roll printer to print a decorative layer on a surface of a film layer, wherein the decorative layer includes cutting lines and a first indication, a curable roller coater to coat a layer on the surface above the print layer, a laminator to laminate a mask over the print layer, a cutter to cut the print layer into a cut print, a line printer that reads the first indication and prints a second indication on the cut print.

In another embodiment, the line printer retrieves the second indication from an external source based on the first indication.

In another embodiment, the second indicator is a graphic image.

In another embodiment, the first indication is a bar code.

In another embodiment, the first indication is a QR code.

In another embodiment, the external source is a database.

In another embodiment, the line printer prints a time and date stamp on the cut print.

In another embodiment, a reader in the line printer reads the first indication.

In another embodiment, the surface has a width of between 36 inches and 60 inches.

In another embodiment, the surface is comprised on a plurality of removable and non removable layers.

BRIEF DESCRIPTION OF THE DRAWINGS

The features of the present disclosure are believed to be novel and are set forth with particularity in the appended claims. The disclosure may best be understood by reference to the following description taken in conjunction with the accompanying drawings, and the figures that employ like reference numerals identify like elements.

DESCRIPTION

Figure 1:
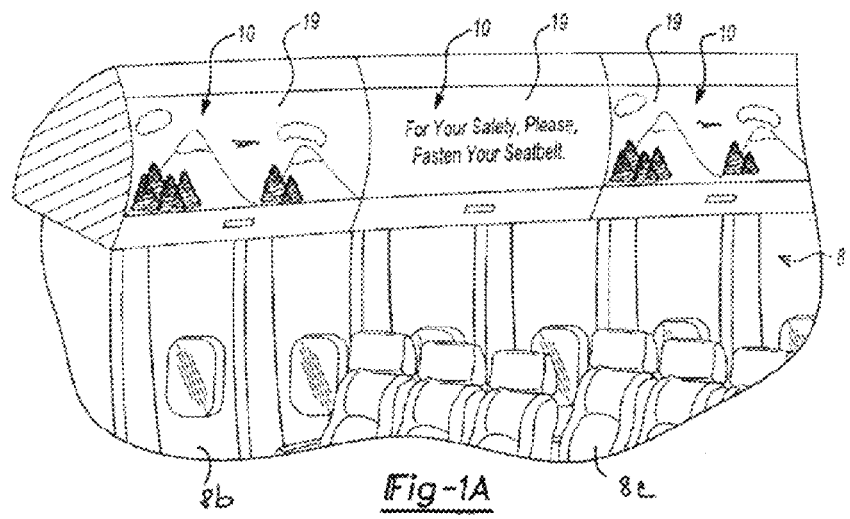
FIG. 1 is a first illustration from the Prior Art.
Figure 2:
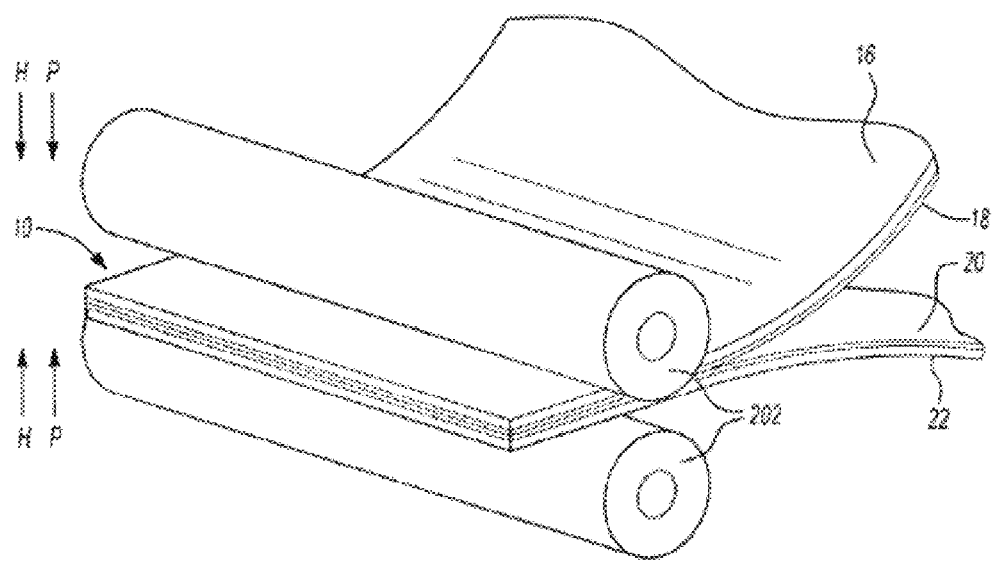
FIG. 2 is a second illustration from the Prior Art.
Figure 3:
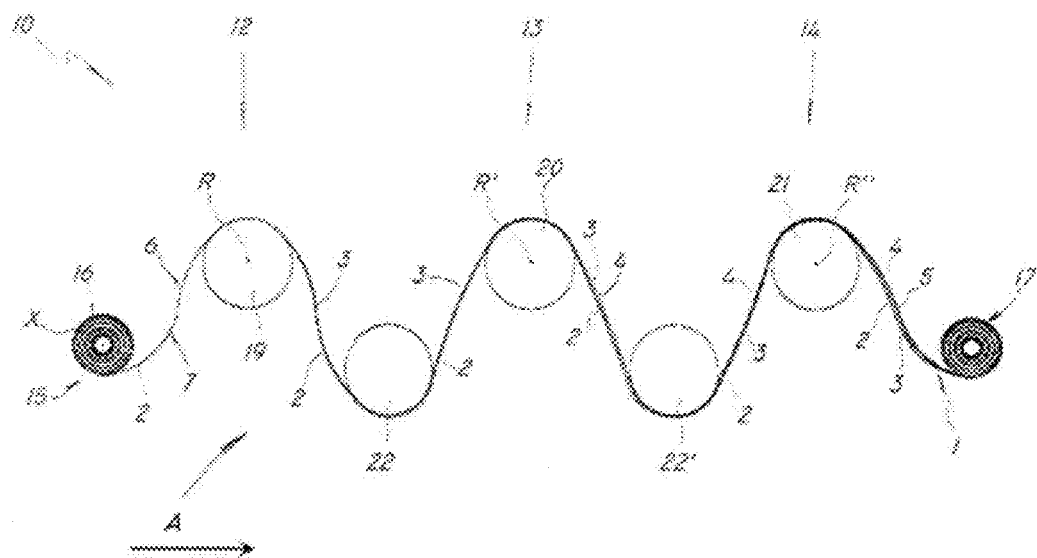
FIG. 3 is a third illustration from the Prior Art.
Figure 4:
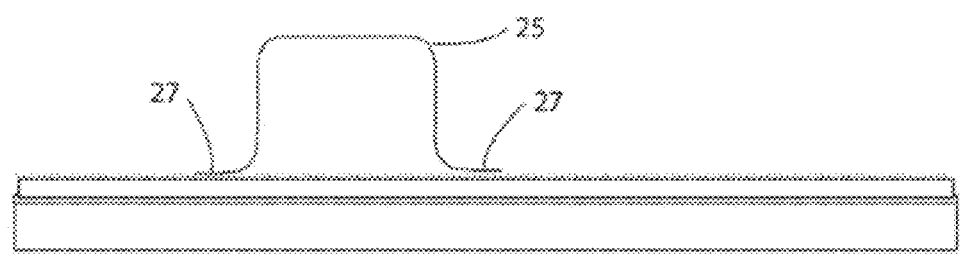
FIG. 4 is a fourth illustration from the Prior Art.
Figure 5:
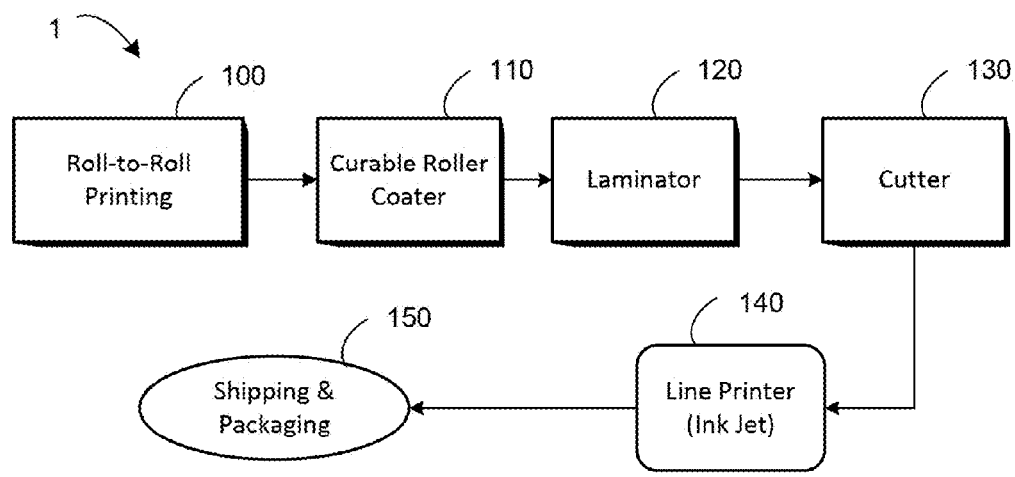
FIG. 5 is an illustration of the multiple process steps associated with the current invention in accordance with one embodiment.

FIG. 5 shows the different steps of the process 1 for manufacturing decorative multilayer coatings, decorative multilayer coatings, and method of use thereof. As described, the current process is directed to using, for example, as part of one embodiment a roll-to-roll printing press 100, a curable roller-coater 110, a laminator 120, a cutter 130 and a line printer 140 to help produce an enhanced and optimized system of manufacturing. Further, the manufacturing process is perfectly adapted for larger size rolls, up to 60 inches in width.

As part of the first portion of FIG. 5, the roll-to-roll printing press will digitally print rolls 13 up to 60 inches—on a digital roll-to-roll press. In one embodiment, the Rho 312R (3 meter machine) from Durst® is used and can manage two (2) 60-inch-wide rolls. In another embodiment, a 5 meter machine from the same supplier can manage up to three (3) 60-inch rolls. The press can print at various speeds and can utilize various roll diameters. The rolls can be on a 3-inch or 6-inch core and will rewind on a 3-inch or 6-inch core. What is contemplated as the best mode is the use of common mandrels on each piece of equipment 100, 110, 120 and 130.

As part of the initial print, a graphic image or an illustration will be printed by the press 100 along with the cut lines for use by the cutter 130. Also contemplated is the printing by the press 100 of a bar code such as a QCR with job-specific information encoded. This information will be used by the line printer 140, which will be mounted on the cutter 130 at the delivery.

Figure 6:
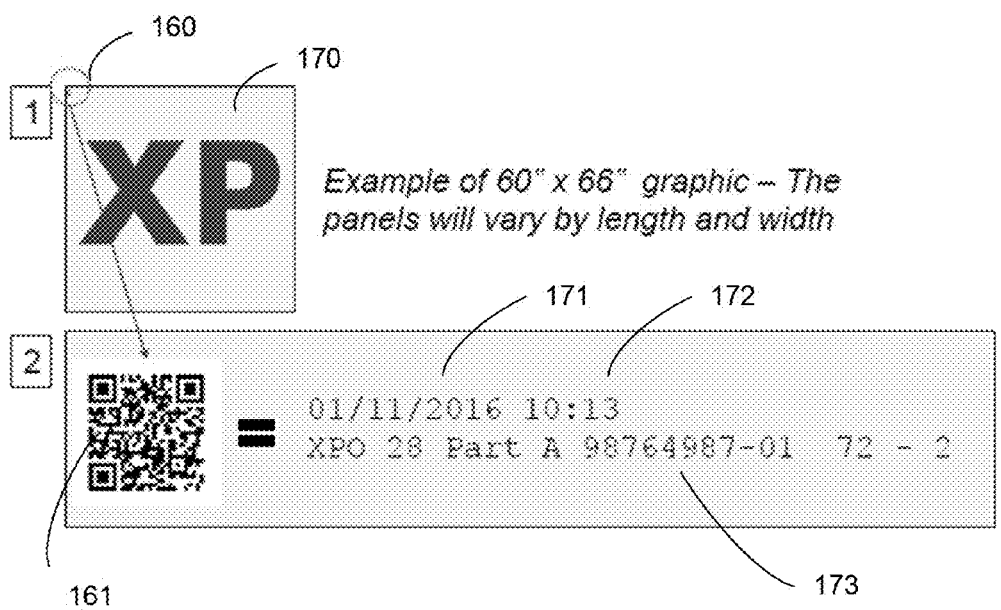
FIG. 6 is a sample illustration of two indications (Indication A & B) used as part of the process shown at FIG. 5 according to one embodiment.

Shown as FIG. 6 is an illustration of a product/piece to be produced 170 with a drawing illustrated by the large XP letters. It the upper left corner of the front face of the product 160 is printed by the press 100 a QCR code 161. Also shown on FIG. 6 is the printing to be done by the line printer 140. For example, the computer inside the line printer 140 can be connected to a database or programmed locally to read the code 161 and generate the codes 173 linked with the job and the client. A time stamp 172 and a date stamp 171 can also be added to the output of the line printer 140.

To continue the description of the equipment contemplated, as a curable roller coater 110, what is contemplated is the VersaCoater™ XL-DSC from Advanced Print & Finishing Technologies®. In one embodiment, the 60/80 UV digital smart coater is contemplated as best use for example, the VCXL60 Digital Smart Coater or the VCXL80 Digital Smart Coater. Some of the curable coatings contemplated for use include the InstaCure UV™; for example, the InstaCure Fleet UV (Product Code ICUV-FUV (glass)), the InstaCure POP™ (ICUV-POPG (gloss), ICUV-POPS (satin) or ICVU-POPM (matte)). As for the multiple cleaners/primers and sealers available, the EasyClean UV (Product Code ECUVC), for example, can be used. In another embodiment, the VersaCoater™ XL64 can be used allowing for width up to 74 inches uncrated and 64 inches crated.

The laminator 120 can be of the type AGL 64 Industrial Laminator having a width of 62 inches. This product is sold by Advanced Greig Laminators® as part of a wide series of laminators. The cutter 130 can also be of the type Colex® Fotoba DreamCut™ XLD-170 of a width of 67 inches to align with the selected laminator 120 and the other pieces of equipment. This fully automatic X/Y cutting system includes in one embodiment a Colex X/Y exit table with stacking cart. In other embodiments, different equipment can be used to help with pre-shipping and wrapping steps.

Next, what is contemplated as a line printer 140 designed to print what is shown at FIG. 6 as elements 171, 172 and 173 is a VideoJet 100 Line Printer from VideoJet®. In this series, for example, the VideoJet 1520 ™ Excel Service system and associated manuals help guide the print. For example, the VideoJet can be installed directly on the Fotoba® DreamCut™ to help an operator process the data. As the print from the sheet is cut, it is slid into the VideoJet, where it is read and prints the elements 171, 172 and 173.

At element 150 as shown at FIG. 5, the sheets produced will be collected on the table or in a box for packaging. If the sheets are collected onto the table, then the graphics will be loosely rolled and inserted into plastic wrap, and the ends will be heat sealed so that the graphics will be protected. The rolled graphic will then be placed in a box ready for shipment. The box will be labeled and stacked onto a skid for shipment or for placement into finished-goods inventory.

Figure 7:
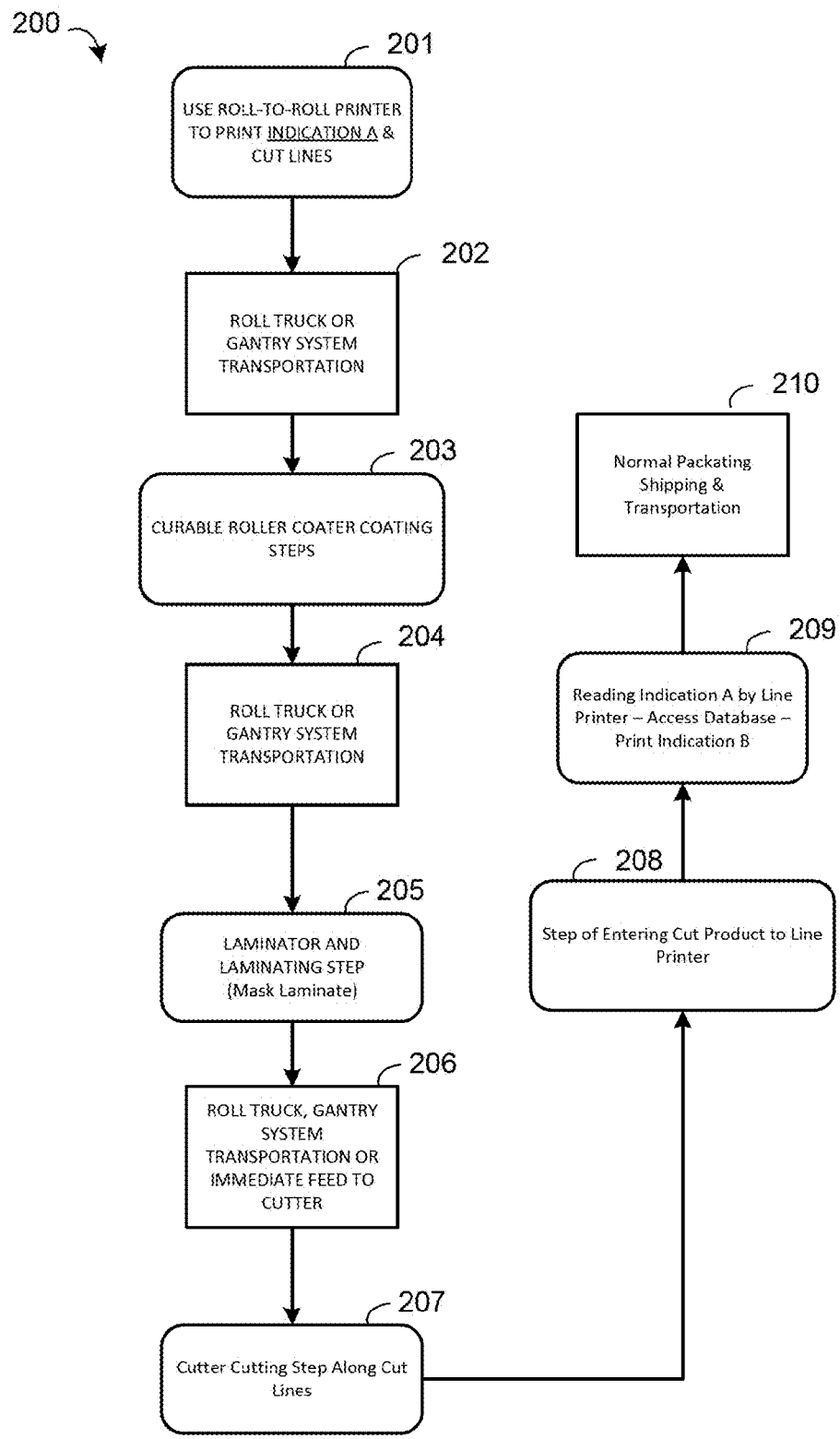
FIG. 7 is a diagram illustrating the different steps of the process shown at FIGS. 5 and 6 according to one embodiment of the present disclosure.

FIG. 7 illustrates embodiments of a method 200 linked with the process and product produced by a process illustrated above. In the first step 201, a roll-to-roll printer prints an indication A (shown on FIG. 6) and also prints a desired design element along with some cut lines to be read at a later step. The roll-to-roll printer then allows the system to roll the finished product where 202 it can be moved to the curable roller coater 203 using either a roll truck or a gantry system. In these steps as described, the transportation from one element to the next is contemplated, but one of ordinary skill in the art will recognize that these different elements can be aligned sequentially to avoid unnecessary movements as part of a single long process.

At step 203, a coating occurs on the curable roller coater. Then once again 204 the roll is moved via either a roll truck or a gantry system to the laminator 205, where it will perform a laminating step. Once again 206 the roll is transported where it is cut 207 on the cutter along cut lines printed by the roll-to-roll printer at step 201. Next, in the step 208 of entering cut product to the line printer (either automatically or manually), the reader 209 will read indication A by the line printer, access data and then print indication B as shown at FIG. 6 with greater detail. Finally, multiple shipping steps can be taken to transport a finished product 210. The time and date stamp 171 and 172 may be generated from the internal memory of the line printer while the bar code will allow for the other elements 173 to be pulled from the system.

Figure 8:
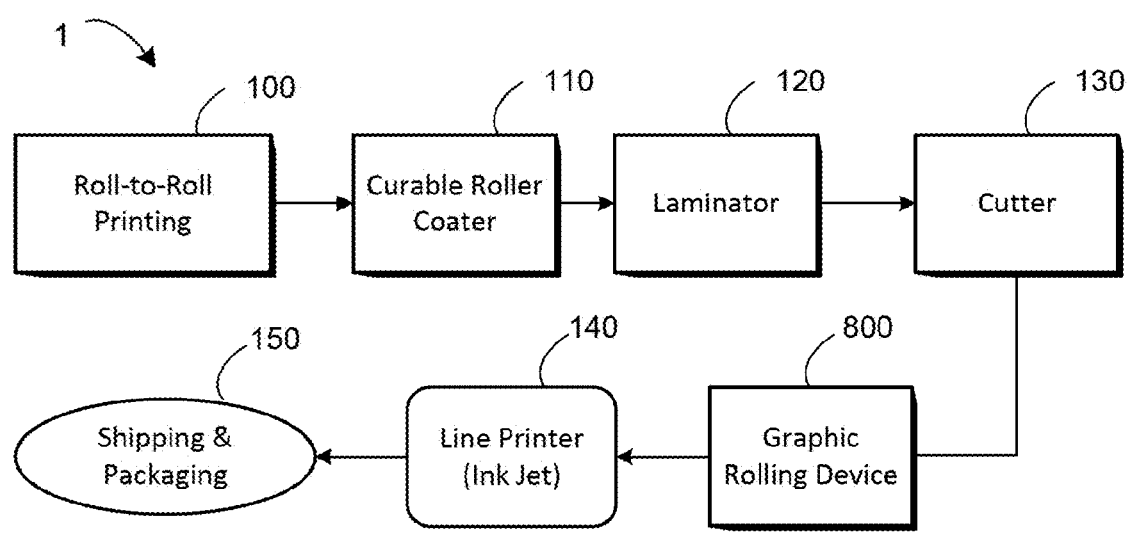
FIG. 8 depicts a diagram illustration of another embodiment of the process steps of FIG. 5.

FIG. 8 shows another embodiment of the different steps of the process of FIG. 5 for manufacturing decorative multilayer coatings and method of use thereof. A graphics rolling device 800 is incorporated after the cutter 130. After the graphics are cut and formatted by the cutter 130, they are moved onto a table in the graphics rolling device 800 where the graphics are loaded onto a slotted lath. The slotted lath rolls the graphics with the images side facing outward. In one embodiment, the slotted lath can accommodate a plurality of graphics or an individual graphic. After being rolled, the images are moved to the shipping portion 150 of the process.

The above process, system, and product differs from the prior art in many additional ways. For example, the above method allows for larger widths of substrate to be processed easily. For example, width of up to 36 inches to 60 inches can be easily accommodated. Also, the above process allows both a system where the different layers as part of a stacked number of layers are removable from one another and not removable (e.g. adhesive on a permanent layer, or a removable layer.). Further, many processes includes heat-based lamination which on polymer-based substrate, can have an adverse influence on transparency or color control.

What is claimed is:

1. A process for optimizing the manufacture of decorative multilayer coatings for attachment to surfaces, including:
   using a roll-to-roll printer to print a decorative layer on a surface of a film layer, wherein the decorative layer includes cutting lines and a first indication;
   using a curable roller coater to coat a layer on the surface above the print layer;
   using a laminator to laminate a mask over the print layer;
   using a cutter to cut the print layer into a cut print; and
   entering the cut print layer into a line printer to read the first indication and print a second indication on the cut print.

2. The process of claim 1 including the step of the line printer retrieving the second indication from an external source based on the first indication.

3. The process of claim 2 wherein the second indicator is a graphic image.

4. The process of claim 2 wherein the external source is a database.

5. The process of claim 1 wherein the surface is comprised on a plurality of removable and non removable layers.

6. The process of claim 1 wherein the first indication is a bar code.

7. The process of claim 1 wherein the first indication is a QR code.

8. The process of claim 1 wherein the line printer prints a time and date stamp on the cut print.

9. The process of claim 1 wherein the line printer includes a reader configured to read the first indication.

10. The process of claim 1 wherein the surface has a width of between 36 inches and 60 inches.

11. A manufacturing optimization system for decorative multilayer coatings for attachment to surfaces, including:
    a roll-to-roll printer to print a decorative layer on a surface of a film layer, wherein the decorative layer includes cutting lines and a first indication;
    a curable roller coater to coat a layer on the surface above the print layer;
    a laminator to laminate a mask over the print layer;
    a cutter to cut the print layer into a cut print,
    a line printer that reads the first indication and prints a second indication on the cut print.

12. The system of claim 11 wherein the line printer retrieves the second indication from an external source based on the first indication.

13. The system of claim 12 wherein the second indicator is a graphic image.

14. The system of claim 12 wherein the external source is a database.

15. The system of claim 11 wherein the surface is comprised on a plurality of removable and non removable layers.

16. The system of claim 11 wherein the first indication is a bar code.

17. The system of claim 11 wherein the first indication is a QR code.

18. The system of claim 11 wherein the line printer prints a time and date stamp on the cut print.

19. The system of claim 11 including a reader in the line printer that reads the first indication.

20. The system of claim 11 wherein the surface has a width of between 36 inches and 60 inches.

* * * * *